United States Patent [19]

Reynolds

[11] 4,354,595
[45] Oct. 19, 1982

[54] APPARATUS AND METHOD FOR MAINTAINING POSITIONAL ALIGNMENT BETWEEN TWO SPACED-APART POINTS ON A MOVEABLE MEMBER

[76] Inventor: Augustus T. Reynolds, 3300 Woodwardia Dr., Charlotte, N.C. 28210

[21] Appl. No.: 165,527

[22] Filed: Jul. 3, 1980

[51] Int. Cl.³ .................... B65G 39/16; F15B 11/22
[52] U.S. Cl. .................... 198/807; 91/171; 226/21; 474/104
[58] Field of Search .................... 198/807, 806, 810; 474/104, 123; 91/171; 226/21, 22, 23

[56] References Cited
U.S. PATENT DOCUMENTS

| | | |
|---|---|---|
| 2,602,298 | 7/1952 | Ashton et al. ............ 91/171 |
| 2,761,285 | 9/1956 | Beecroft ................. 91/171 |
| 2,764,869 | 10/1956 | Scherr ................... 91/171 |
| 2,914,957 | 12/1959 | Johnson ................ 198/807 X |
| 2,932,171 | 4/1960 | Ranson ................. 91/171 X |
| 3,159,268 | 12/1964 | Dyke . | |
| 3,489,264 | 1/1970 | Begiebing . | |
| 3,603,451 | 9/1971 | Promin et al. . | |
| 4,173,904 | 11/1979 | Repetto ................. 474/104 |

*Primary Examiner*—Jeffrey V. Nase
*Attorney, Agent, or Firm*—W. Thad Adams, III

[57] ABSTRACT

The invention relates to a method and apparatus for maintaining relative positional alignment between two spaced-apart points on a moveable member, such as a rotating axle on which is mounted a conveyor belt pulley. The invention comprises a hydraulic pump (80) which is operatively communicated to first and second hydraulic cylinders (21 and 30, respectively). The first hydraulic cylinder (21) applies a reference hydraulic pressure to a first point (13) on the axle (11) and moves the axle (11) to maintain the pressure at a constant, pre-determined pressure level. The second hydraulic cylinder (30) is operatively connected to a second point (12) on the axle (11) spaced apart from the first point (13). A fork (77) and pin (42) mechanism senses relative movement between the first point (13) and the second point (12) on the axle (11). A hydraulic servo-valve (60) directs hydraulic fluid to the second hydraulic cylinder (30) for moving the axle (11) at its second point (12) in a direction and for a distance corresponding to the movement of the axle (11) at the first point (13).

17 Claims, 6 Drawing Figures

APPARATUS AND METHOD FOR MAINTAINING POSITIONAL ALIGNMENT BETWEEN TWO SPACED-APART POINTS ON A MOVEABLE MEMBER

BACKGROUND OF THE INVENTION

This invention relates to a method and apparatus for maintaining relative positional alignment between two spaced-apart points on a moveable member. The method and apparatus disclosed and claimed below has a wide range of application. The particular embodiment disclosed and described in this application relates to the use of the apparatus and method on a driven tail pulley which supports one end of an endless bucket conveyor belt such as is used in grain elevators. The apparatus and method according to the present invention enables the belt to be positioned and maintained in the precise center of the tail pulley. The present invention also permits the maintenance of proper tension on the moving conveyor belt, thereby preventing slippage between the belt and the drive pulley.

The conveyor belt and associated equipment referred to in the embodiment described below are contained in what is referred to in the grain storage industry as a "head house." The conveyor belt has buckets affixed to it in spaced-apart relation which are used to carry the product from a storage bin upwardly to the top of a grain elevator complex, where the product is then directed into a selected storage elevator. The conveyor belt is driven by a head pulley located in the top of the head house. The pulley is driven by a large electric motor with a gear reduction apparatus which reduces the rpm of the head pulley to between 20 and 50 revolutions per minute. The linear speed of the moving conveyor belt may be between 180 and 245 meters per minute and the overall height of the conveyor, from 30 to 90 meters. The tail pulley is positioned in the lower portion of the head house in a box-like metal container called a "boot" and is driven by the movement of the conveyor belt around its periphery.

In recent years, federal health and safety laws have required that a shroud of duct work be installed closely around the moving belt in order to enclose it and prevent the build up of dust in the head house. This has been done not only because of the perceived danger to employees of breathing dust-laden air, but also to prevennt violent explosions caused by dust-laden air being ignited by heat or sparks.

While the erection of this shroud completely around the belt path does reduce the build up of dust in the surrounding environment, the air inside the shroud in close proximity to the moving conveyor belt is saturated with dust. It is therefore imperative to prevent sparks or the build up of heat within this shroud.

Heat build-up can be minimized by maintaining proper tension on the belt. There are many factors which can cause variation in the tension of the belt around the rotating head and tail pulleys. For example, loading of the buckets on the conveyor belt with product greatly increases the weight on the belt, causing it to stretch. The lack of sufficient tension causes the belt to slip as it passes around the head pulley. The relative movement between the conveyor belt and the head pulley causes friction and the build up of heat.

In order to prevent this slippage, the tail pulley is mounted on what is referred to as a "take-up bearing," wherein each end of the tail pulley axle is rotatably positioned in a bearing block, and mounted, respectively, for adjustable sliding movement within opposing slots in the boot. As required, the bearings on both sides of the take-up pulley are weighted in order to provide tension on the head and tail pulleys around which the belt moves. Heretofore, any tension adjustment has usually been made manually.

Because the conveyor belt is enclosed within the shroud, it is particularly important to maintain the rotating conveyor belt in its proper position in the center of the tail pulley, and to prevent the belt from moving from side to side. As mentioned above, the linear speed of the moving conveyor belt may be as much as 180 to 245 meters per minute. Any rubbing of the belt against the interior walls of the shroud in an atmosphere laden with dust can cause a rapid build up of heat or a spark which causes explosive ignition of the dust.

It is known that in order for a conveyor belt to move around an end pulley without lateral, or side-to-side, movement, the axis of rotation of the pulley axle must be 90° to the center line of the belt. Since, as already discussed, conveyor belts are subject to a variety of factors which can cause variation in belt tension, including the necessity of independently adjusting the take-up bearing on one side or the other of the tail pulley in order to keep the conveyor belt centered, the solution lies in establishing and maintaining relative positional alignment between two spaced-apart points on the pulley axle. In the preferred embodiment disclosed below, these two spaced-apart points are defined as first and second take-up bearings mounted on the pulley for independent planar movement. As is therefore apparent, an adjustment necessary to keep the conveyor belt centered may have an adverse effect on belt tension, and vice versa.

Numerous attempts have been made in the past to devise machines for automatically centering an endless band, such as a conveyor belt, trained over two spaced-apart rolls. For example, the Repetto U.S. Pat. No. 4,173,904 discloses such an apparatus which, as in many other prior art patents, senses lateral movement by means of levers positioned near the opposite side edges of the moving belt which are tripped by lateral off-center movement of the belt. In Repetto, the band is automatically centered by two hydraulic cylinder-piston units. The first unit displaces one end of the stretching roll in one plane, and the second cylinder simultaneously displaces the other end in a plane perpendicular to the first.

The Promin U.S. Pat. No. 3,603,451 discloses side-positioned sensors which move a transverse idler roller on which the belt is supported angularly in a plane parallel to that of the direction of belt movement and in a direction to recenter the belt. The sensors comprise rollers adapted to rotate when the adjacent side edge of a moving belt comes into contact with it. The rotation of the sensing roller by this contact action drives a hydraulic pump which pumps fluid to a cylinder connected to the idler roller which then moves the idler roller in such direction as to position the belt in its center.

The Dyke U.S. Pat. No. 3,159,268 discloses another use of side sensors, which are positioned on the same side of the belt and control the upwardly or downwardly movement of an adjusting screw.

As is recognized in the Begiebing U.S. Pat. No. 3,489,264, overshooting of the belt from one side of the roller to the other as hydraulic correction takes place is a problem which has been inherent in most previous belt-training mechanisms. In Begiebing, a mechanism is disclosed which damps the "hunting" tendency of belt-training mechanisms which are susceptible to continual over-correction in alternate directions as the belt continuously moves from side to side on the roller.

Insofar as is known, no prior belt training apparatus is capable of simultaneously maintaining precise tension on a rotating conveyor belt, while maintaining the belt in the center of the rotating pulley without over-correction from side to side.

SUMMARY OF THE INVENTION

Accordingly, it is an object of this invention to provide an apparatus and method for maintaining relative positional alignment between two spaced-apart points on a moveable member.

It is a further object of this invention to provide an apparatus and method for maintaining relative positional alignment in a plane between two spaced-apart points on a rotatable axis.

It is a more specific object of this invention to provide an apparatus and method for maintaining a moving conveyor belt in the center of a rotating pulley and under proper tension.

These and other objjects and advantages of the present invention are achieved in the preferred embodiment of the apparatus described below by providing an apparatus for maintaining relative positional alignment between two spaced-apart points on a moveable member, such as the rotating axle of a pulley on which is mounted a moving conveyor belt.

The apparatus comprises a hydraulic pump with first hydraulic means operatively connected to the hydraulic pump and to a first point on the member for applying a reference hydraulic pressure to the member and for moving the member to maintain the applied pressure at a constant, pre-determined pressure level. Second hydraulic means are operatively connected to the hydraulic pump and to a second point on the member spaced-apart from the first point.

Sensing means cooperate with the member for detecting movement of the member at the first point relative to the second point. Hydraulic servo-valve means cooperate with the sensing means and selectively direct hydraulic fluid to the second hydraulic means in response to the sensing means for moving the member at the second point in a direction and for a distance corresponding to the movement of the member at the first point. In this manner, the member at the second point follows the movement of the member at the first point and maintains relative positional alignment between the first point and the second point on the member.

According to a preferred embodiment of the apparatus according to the present invention, the first and second hydraulic means each comprise a hydraulic cylinder. The sensing means preferably comprises a first platform operatively connected to the member at the first point and mounted for movement corresponding to the movement of the member at the first point; a second platform operatively connected to the member at the second point and mounted for movement corresponding to the movement of the member at the second point; and means for quantifying the movement of the first platform relative to the second platform and for transmitting the relative movement to the hydraulic valve.

In accordance with one preferred embodiment of the invention, the hydraulic servo-valve means comprises a circular valve housing having at least first and second ports for conveying hydraulic fluid to the second hydraulic cylinder. A valve body is mounted for rotational movement within the valve housing and has a valve stem mounted thereon and cooperatively engages with the other of the first and second platforms for rotating the valve and directing the fluid to the first or second ports in response to and proportional to the relative movement between the first platform and the second platform.

In accordance with the present invention, a method is disclosed for maintaining relative positional alignment between two spaced-apart points on a moveable member. A preferred method according to the present invention comprises the steps of applying a hydraulic reference pressure to the member at a first point. The member is moved at the first point to maintain the reference hydraulic pressure at a constant, pre-determined pressure level. The movement of the member is sensed at a second point on the member spaced-apart from the first point and a hydraulic pressure is directed to the second point in response to the sensed movement of the first point relative to the second point. The hydraulic pressure moves the member at the second point in a direction and for a distance corresponding to the movement of the member at the first point.

BRIEF DESCRIPTION OF THE DRAWINGS

Some of the objects and advantages of the invention have been set forth above. Other objects and advantages will appear as the description of the invention proceeds, when taken in conjunction with the following drawings, in which.

DESCRIPTION OF THE PREFERRED EMBODIMENT

Figure 1:
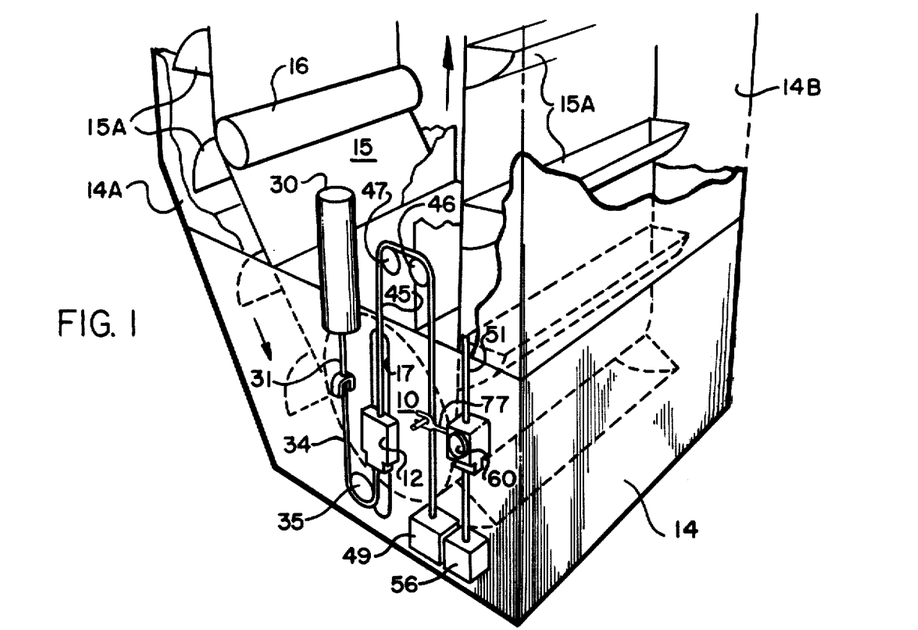
FIG. 1 is a perspective view, with parts broken away, of an apparatus according to the present invention mounted on a tail pulley within a "boot;"
Figure 2:
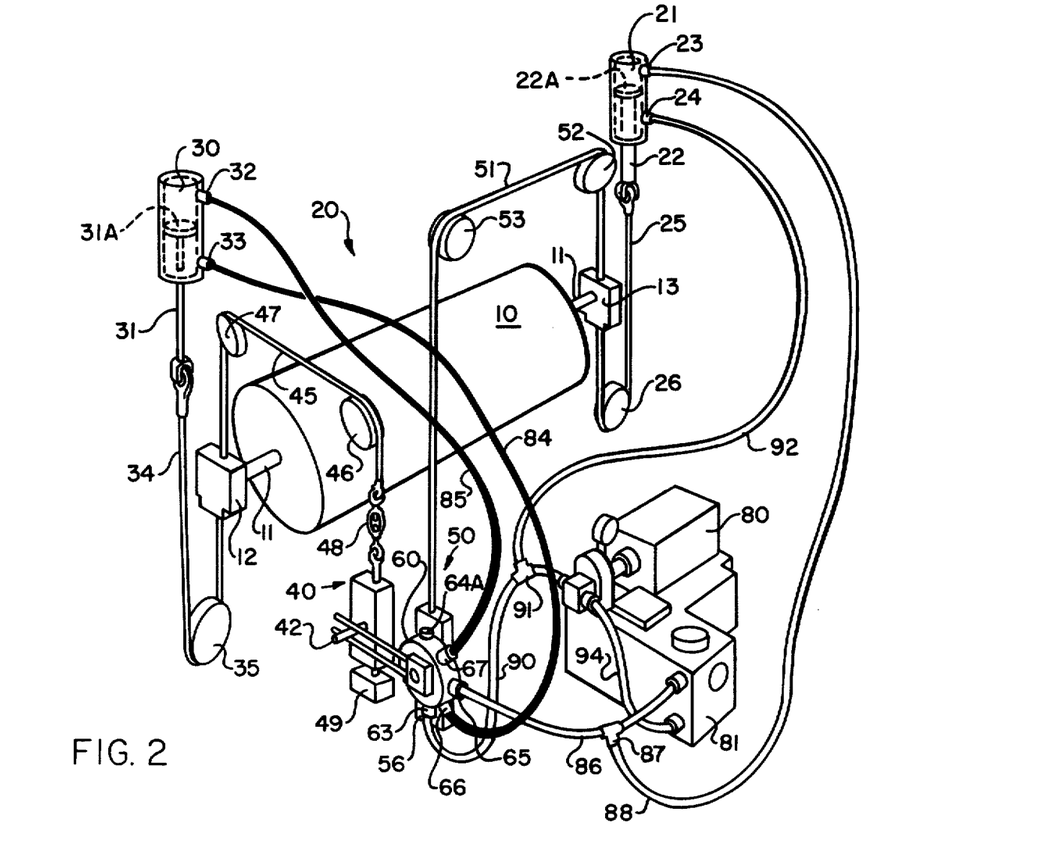
FIG. 2 is a perspective view of the apparatus according to the present invention mounted on a tail pulley.

Referring now specifically to the drawings, an apparatus for maintaining relative positional alignment between two spaced-apart points on a moveable member according to a preferred embodiment is shown in FIG. 2. The preferred embodiment of the invention which is disclosed and described below relates to a belt training apparatus used to maintain a moveable bucket conveyor in a centered and properly tensioned relationship to a driven tail pulley around which the moving bucket conveyor belt moves, as is shown in FIG. 1.

- Still referring to FIG. 2, a tail pulley 10 is shown mounted for concentric rotation on an axle 11. The outwardly extending, opposed ends of the axle 11 are mounted, respectively, in a take-up "follow-up" bearing 12 and a take-up "reference" bearing 13.

As is shown in FIG. 1, tail pulley 10 is mounted within a "boot" 14, which comprises a trough-like enclosure. A bucket conveyor belt 15 is positioned around tail pulley 10 and passes into and out of the boot 14 through upwardly extending ducts 14a and 14b, respectively. A plurality of evenly spaced-apart buckets 15a are affixed to the outwardly facing surface of the conveyor belt 15 and pass successively around the tail pulley 10, thereby collecting grain or some other similar product and carrying it to the other end of the conveyor where the buckets empty. In order to space opposite sides of the belt 15 further apart, a bend pulley 16 is provided.

As is shown in FIG. 1, a vertically extending elongate aperture 17 is formed in the side of boot 14. One end of axle 11 extends through aperture 17 and is rotatably mounted in follow-up bearing 12. The width of aperture 17 is somewhat greater than the outside diameter of axle 11 in order that it may move upwardly and downwardly therein. The other end of axle 11, which is mounted in reference bearing 13, is identically positioned in another vertical aperture (not shown) in the diametrically opposite wall of boot 14.

Referring now to FIG. 2, the belt training apparatus is broadly shown at reference numeral 20. For purposes of clarity, certain details of the structure on which the belt training apparatus 20 is mounted have been omitted from the drawings. The mounting structure is conventional—a steel frame, for example—and a matter of choice. In those instances where a preferred method of mounting the belt training apparatus 20 has been determined, a description of the structure sufficient for clear understanding is provided.

A hydraulic cylinder 21 (referred to hereinafter as a "reference" cylinder 21) is rigidly mounted on a suitable structure such as a steel frame with a piston rod 22, having an enlarged piston head 22a, moveably positioned therein. A fluid port 23 fluidly communicates with the top side of the reference cylinder 21 and a fluid port 24 fluidly communicates with its bottom side.

Reference cylinder 21 has a bore of 7.62 cm. Piston rod 22 is 5.08 cm. in diameter and has a 40.64 cm. stroke. The blind area of the piston head 22a is 45.6 sq.cm., and the rod area is 20.26 sq.cm., leaving a net area of 25.34 sq.cm.

Piston rod 22 is detachably connected by means of a steel cable 25 to the downwardly facing lower surface of reference bearing 13. The cable 25 passes around a rotatably mounted pulley 26 so that upward movement of the piston rod 22 is translated into a corresponding downward movement of the reference bearing 13, and vice versa.

A hydraulic cylinder 30 (referred to herinafter as a "follow-up" cylinder 30) is rigidly mounted on a suitable structure with a piston rod 31 having an enlarged piston head 31a moveably positioned therein. A fluid port 32 fluidly communicates with the top side of the follow-up cylinder 30, and a fluid port 33 fluidly communicates with its bottom side.

Follow-up cylinder 30 has a 7.62 cm. bore. Piston rod 31 is a 3.18 cm. in diameter and has a stroke of 40.64 cm. As with reference cylinder 21, follow-up cylinder 30 has a blind area of 45.6 sq.cm. However, piston rod 31 of the follow-up cylinder 30 occupies an area of only 7.9 sq.cm., leaving a net area of 37.7 sq.cm. The reason for the substantial differential in net cylinder areas between the reference cylinder 21 and follow-up cylinder 30 is explained hereinafter.

Piston rod 31 is detachably coupled to the lower, downwardly facing side of follow-up bearing 12 by means of a steel cable 34. Cable 34 passes around a rotatably mounted pulley 35, so that upward movement of the piston rod 31 is translated into a corresponding downward movement of the follow-up bearing 12, and vice versa.

Sensing means are provided for detecting movement of follow-up bearing 12 and reference bearing 13, respective to each other. The sensing is accomplished by means of a follow-up platform 40 and a reference platform 50.

As is shown in FIG. 2, follow-up platform 40 comprises a substantially rectangular steel plate having an outwardly projecting pin 42 mounted thereon. The follow-up platform 40 is coupled to follow-up bearing 12 by means of a steel cable 45. The cable 45 passes around two rotatably mounted pulleys, 46 and 47, thus translating downward movement of the follow-up bearing 12 into upward movement of the follow-up platform 40, and vice versa. A turnbuckle 48 is provided between cable 45 and follow-up platform 40 in order to provide adjustment of the distance from the follow-up bearing 12 to follow-up platform 40. A weight 49 is suspended from beneath the follow-up platform 40 and takes up any thermal expansion or stretch in cable 34 or cable 45. A weight of approximately 23 Kg. has been found satisfactory for this purpose.

The reference platform 50 is suspended in close, lateral spaced-apart relation to the follow-up platform 40. The reference platform 50 is suspended by means of a steel cable 51 which interconnects the reference platform 50 and the reference bearing 13. The cable 51 is passed over and around rotatably mounted pulleys 52 and 53, so that downward movement of the reference bearing 13 is ranslated into upward movement of the reference platform 50, and vice versa. A weight 56, also of approximatey 23 Kg., is suspended from beneath reference platform 50 and takes up any thermal expansion or stretch in cables 51 and 25.

While not shown in the drawings, the follow-up platform 40 and the reference platform 50 may be slidably mounted in separate, vertically extending and parallel guides in order to prevent lateral movement of the follow-up platform 40 and reference platform 50 and insure smooth vertical travel.

As is shown in FIG. 2, movement of follow-up bearing 12 is transmitted by steel cables 35 and 45 to the follow-up cylinder 30 and the follow-up platform 40, respectively. Likewise, movement of reference bearing 13 is transmitted by steel cables 25 and 51 to the reference cylinder 21 and reference platform 50, respectively.

Figure 3:
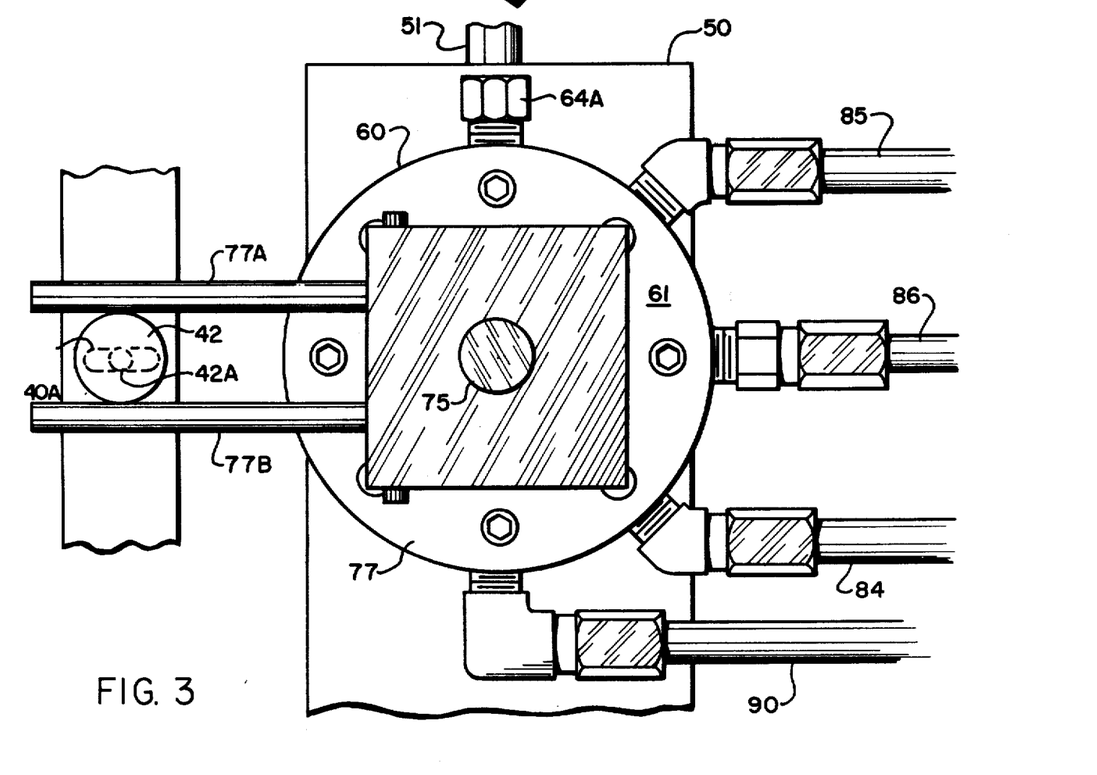
FIG. 3 is an elevational view of the hydraulic servo-valve and the mechanism for sensing relative movement between the first and second platform.

As is shown in FIGS. 2 and 3, a hydraulic servo-valve 60 is mounted on reference platform 50. The valve 60 is shown in cross-section in FIG. 4, and comprises a valve housing 61 which is cylindrical in cross-section and defines a central cylindrical valve aperture 62 therein. Valve 60 is a four-way rotary valve having proportional flow characteristics. Five ports are spaced in a semi-circle around the outer periphery of the valve housing 61 and communicate through its walls with the central valve aperture 62. Pump ports 63 and 64 in the walls of valve housing 61 are in diametrical opposition to each other. Since only one port for conveying fluid from the pump is necessary, port 64 is plugged with a plug 64a and therefore inoperative.

Figure 4:
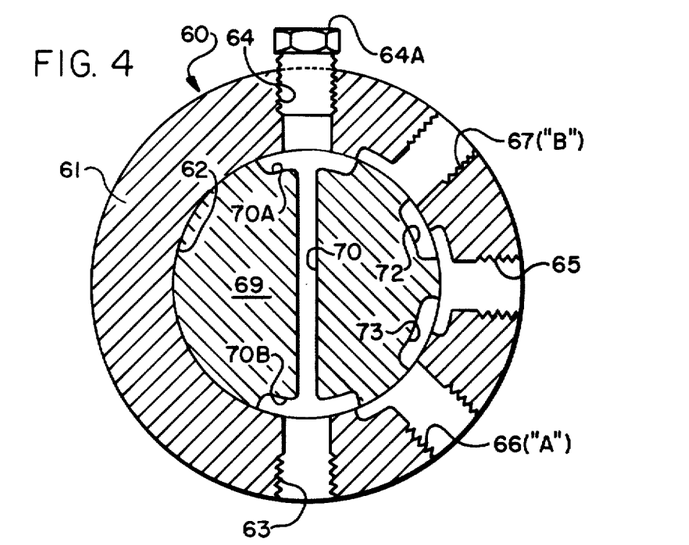
FIG. 4 is a vertical cross-sectional view of the hydraulic servo-valve shown in FIG. 3.

A tank port 65 communicates through the walls of valve housing 61 with valve aperture 62 in substantial perpendicular relation to pump port 63. As is also shown in FIG. 4, "A" port 66 communicates through the walls of valve housing 61 with valve aperture 62 intermediate pump port 63 and tank port 65. Likewise, "B" port 67 communicates through the valve housing 61 with aperture 62 intermediate the tank port 65 and the plugged pump port 64.

Pump ports 63 and 64, tank port 65, and "A" and "B" ports 66 and 67, respectively, are threaded with internal threads for receiving matingly threaded hydraulic hose connectors, as is shown in FIG. 3.

Also, FIG. 4 illustrates that tank port 65 is symetrically enlarged at its terminus with the valve aperture 62. "A" port 66 and "B" port 67 are asymetrically enlarged in the direction of pump ports 63 and 64, respectively.

Still referring to FIG. 4, a centrally disposed and rotatable valve body 69 is shown rotatably mounted within the central valve aperture 62. The valve body 69 defines a diametrically positioned valve body aperture 70, having enlarged opposing end portions 70a and 70b. Also formed in the radial surface of the valve body 69 are valve body channels 72 and 73.

The cross-sectional view in FIG. 4 illustrates valve 60 in a neutral position. In the neutral position valve 60 has a slightly negative "lap," with valve body aperture 70 being in slight fluid communication with "A" port 66 and "B" port 67. The importance of this neutral configuration is explained below.

As is illustrated in FIG. 3, valve body 69 is rotated within housing 61 by means of an attached valve stem 75. The movement of follow-up bearing 12 relative to reference bearing 13 is sensed by a fork 77 mounted for rotation on valve stem 75 and having laterally extending tines 77a and 77b positioned on opposite sides of, and in closely spaced relation to, pin 42. One embodiment of the fork 77 is shown in FIGS. 2 and 3. Another embodiment is shown in FIG. 1.

As is illustrated in FIG. 3, a pin 42 is mounted on follow-up platform 40 by means of a lateral slot 40a and a adjustable bolt 42a, so that pin 42 can be moved laterally either away from or towards reference platform 50.

The components of the apparatus as described above are interconnected and operated by means of a hydraulic pump 80 having a return tank 81.

Pump 80 is powered by a two horsepower, three phase electric motor of any desired voltage. Maximum flow rate for pump 80 is approximately 7.6 liters per minute at a maximum pressure of 42.2 Kg. per sq.cm.

As is shown in FIG. 2, "A" port 66 of valve 60 communicates with the bottom side of follow-up cylinder 30 by means of a hydraulic hose 84. "B" port 67 communicates with the top side of follow-up cylinder 30 by means of a hydraulic hose 85. Tank port 65 of valve 60 is connected to tank 81 by means of hydraulic hose 86. Coupler 87 interconnects hose 86 with hose 88, which fluidly interconnects with the top side of the reference cylinder 21 by means of fluid port 23.

Pump port 63 communicates with pump 80 by means of a hydraulic hose 90 which interconnects with hydraulic hose 92 by means of a coupler 91. Hose 92 is fluidly interconnected with the bottom side of the reference cylinder 21 by means of fluid port 24. Pump 80 is replenished with fluid from tank 81 by a hydraulic hose 94.

Referring again to FIG. 4, it can now be seen that the follow-up cylinder 30 and the reference cylinder 21 are fluidly interconnected through the servo-valve 60. As briefly described above, valve 60 is a "negative lap" type valve with a zero dead bank. Valve 60 is always feeding hydraulic fluid to the follow-up cylinder 30 through "A" port 66 or "B" port 67. Pump port 63 introduces hydraulic fluid into the valve 60, and in its neutral position, valve 60 allows a very slight amount of fluid to flow to both sides of follow-up cylinder 30 through "A" port 66 and "B" port 67, respectively. Fluid is recirculated to tank 81 through valve 60 by the intercommunication of "A" port 66 to tank port 65 through valve body aperture 73; and by "B" port 67 to tank port 64 through valve body aperture 72.

The actuating torque for valve 60 is approximately 0.0282 newton meters at the maximum rated flow of 7.6 liters per minute. Above 7.6 liters per minute the torque increases proportional to the increase in volume. Maximum recommended operating pressure for valve 60 is 140.6 Kg. per sq.cm. Operating pressure has an insignificant effect on actuating torque.

The apparatus maintains the relative position of follow-up and reference bearings 12 and 13, respectively. By doing so, it simultaneously maintains the conveyor belt 15 in a centered position on the tail pulley 10, and maintains the proper, predetermined tension on the conveyor belt in order to prevent slippage and heat build up.

It is assumed that the axle 11 will be set to a reference point which is 90° to the center line of the conveyor belt 15. However, the apparatus will maintain proper alignment between the conveyor belt 15 and axle 11 according to any set angle. Alignment is maintained by first applying a "reference pressure" to the reference cylinder 21. This pressure is applied by pump 80 through the pump port 63 and tank port 65. As is shown in FIG. 2, the tank port 65 feeds the top of the reference cylinder 21 through hose 88. Likewise, the pump port 63 feeds the bottom side of reference cylinder 21 through hose 92. The reference bearing 13 moves as is required to maintain the "reference pressure" which is applied thereto. For example, upon loading the conveyor buckets 15a with grain, weight on the conveyor belt 15 is increased, causing it to stretch. Reference bearing 13 moves downward to maintain the "reference pressure."

The follow-up cylinder 30 is slaved to the reference cylinder 21 through valve 60. Pump 80 directs hydraulic fluid to the top or bottom side of the follow-up cylinder 30 as is required for follow-up bearing 12 to "follow" the movement of reference bearing 13.

Referring to FIG. 3, pin 42 is shown positioned within fork tines 77a and 77b. As is described above, the follow-up platform 40 and reference platform 50 are connected to follow-up bearing 12 and reference bearing 13, respectively. Since bearings 12 and 13 are mounted so as to be capable of independent movement, the reference platform 50 and the follow-up platform 40 are likewise capable of independent up and down movement. In the discussion that follows, two modes of error will be referred to:

(a) "Clockwise error" refers to any relative movement of the follow-up platform 40 relative to the reference platform 50 which causes the valve stem 75 of the valve 60 to move in a clockwise direction. This can occur in either of two ways. First, the follow-up bearing 12 can move downwardly relative to reference bearing 13. This downward movement causes the follow-up platform 40 to rise. As the pin 42 rises, it brings with it the fork tines 77a and 77b causing the valve stem 75 of the valve 60 to rotate clockwise. Clockwise error can also occur as a result of upward movement of the reference bearing 13. Upward movement of the reference bearing 13 is transmitted as a downward movement of reference platform 50. Thus, as in the instance of upward movement of follow-up platform 40, valve stem 75 moves clockwise because of the relative downward movement of the reference platform 50.

(b) "Counterclockwise error" refers to any relative movement which causes the valve stem 75 to rotate counterclockwise. Therefore, upward movement of the follow-up bearing 12 is transmitted as downward movement of follow-up platform 40 relative to reference platform 50. The pin 42 causes the downward movement of fork tines 77a and 77b causing counterclockwise rotation of valve stem 75. Likewise, the downward movement of reference bearing 13 is transmitted as upward movement of reference platform 50, again causing counterclockwise rotation of valve stem 75.

Figure 5:
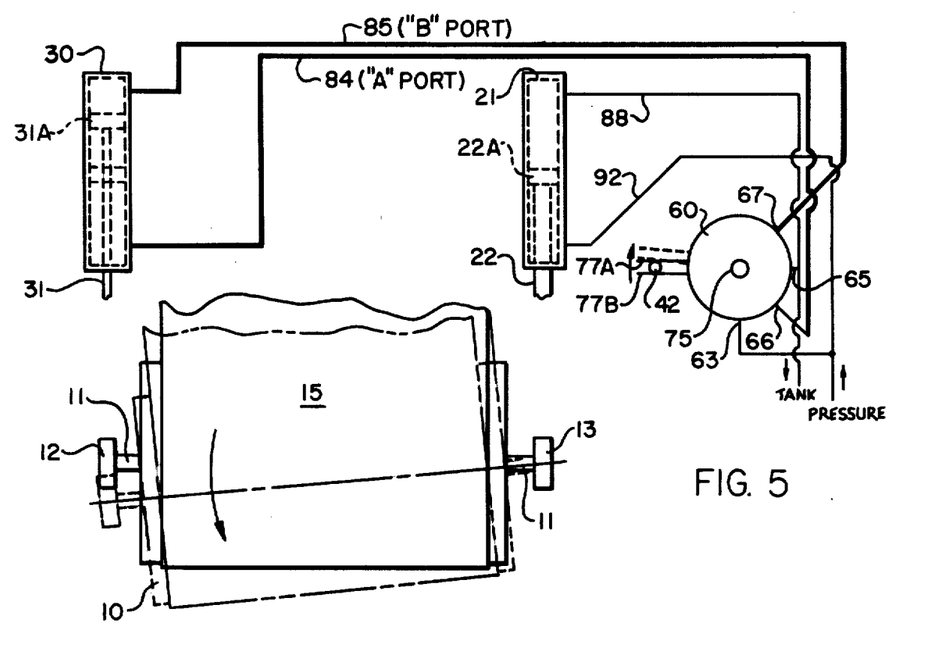
FIG. 5 is a schematic, fragmentary view of the apparatus, illustrating response to "clockwise error;" and, FIG. 6 is a schematic fragmentary view of the apparatus, illustrating response to "counterclockwise error."

Clockwise error is corrected in the following manner. Referring to FIG. 5, a situation is shown wherein follow-up bearing 12 moves downwardly out of alignment with reference bearing 13. This relative movement is transmitted in the manner described above causing clockwise rotation of the valve stem 75. Valve body 69 is moved clockwise within the valve housing 61, causing the pump 80 to feed fluid through pump port 63 and to the top side of follow-up cylinder 30 through "B" port 67. Meanwhile, the bottom side of follow-up cylinder 30 ("A" port 66) feeds tank port 65. This causes piston rod 31 to move downwardly into follow-up cylinder 30 thus raising follow-up bearing 12 back into its proper position in alignment with reference bearing 13.

As this correction takes place, fluid flow decreases as follow-up platform 40 and reference platform 50 move back into proper alignment and resumes its "neutral" flow rate when proper alignment is re-established.

As described above, upward movement of reference bearing 13 relative to follow-up bearing 12 also causes clockwise rotation of valve stem 75 with exactly the same results, in that fluid is supplied to the top side of the follow-up cylinder 30, forcing piston head 31a downwardly, bringing the follow-up bearing 12 up into alignment with the reference bearing 13.

Figure 6:
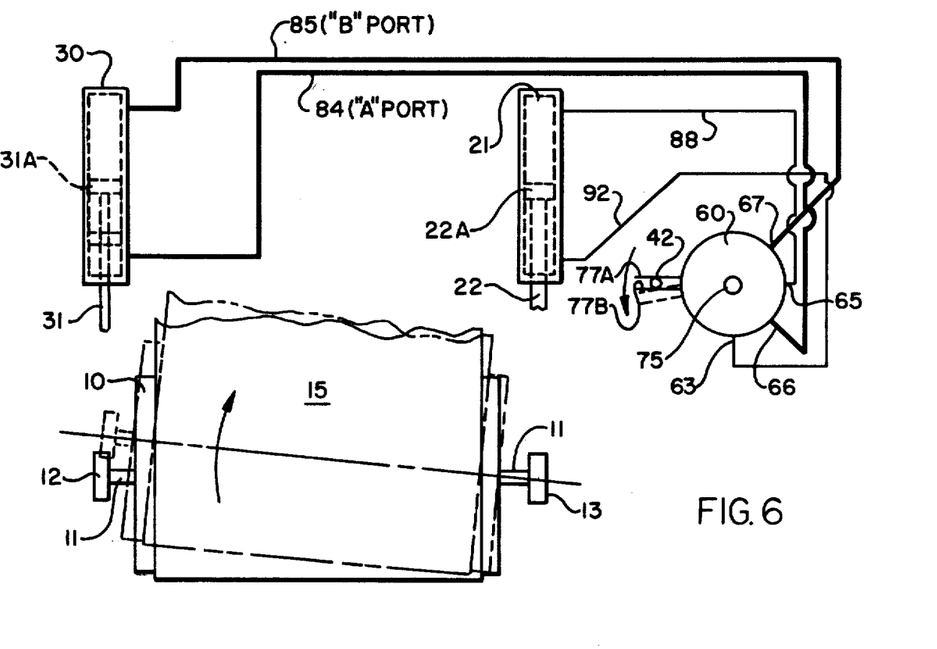

Referring now to FIG. 6, an example of counterclockwise error and correction is shown. The upward movement of the follow-up bearing 12 relative to reference bearing 13 causes counterclockwise movement of valve body 69. This causes pump 80 to feed fluid to "A" port 66, while "B" port 67 feeds tank port 65. "A" port 66, as is shown in FIG. 2, feeds the bottom side of follow-up cylinder 30 through hose 84, forcing piston head 31 upwardly, thereby allowing follow-up bearing 12 to move back down into alignment with reference bearing 13.

Counterclockwise error also occurs as a result of the reference bearing 13 moving down relative to follow-up bearing 12. As described above, this error is corrected by the supplying of fluid to "A" port 66 and to the bottom side of follow-up bearing 30.

It is important to reiterate that the apparatus senses only relative movement of the follow-up platform 40 and reference platform 50. Since the system always maintains the desired "reference pressure" on the reference bearing 13, the tension of the conveyor belt 15 is always maintained at a level sufficient to prevent slippage.

For example, upward movement of follow-up platform 40 and reference platform 50 at the same rate and for the same distance causes no rotation of the valve stem 75, and hence no correction. Alignment is maintained at all times as long as the lineal speed of piston movement within the follow-up cylinder 30 does not exceed the maximum rated flow of the pump 80.

As described above, the net area of the reference cylinder 21 is 25.35 sq.cm., while the net area of the follow-up cylinder 30 is 37.7 sq.cm. Since the pressure throughout the system is the same, the greater area on the piston head 31a compared with piston head 22a dictates that greater force is being applied within the follow-up cylinder 30, than within the reference cylinder 21. This results in the valve body 69 being in a constant dynamic state of rapid and minute occillation, always trying to move to equalize these uneven forces. Only because of the servo-valve 60 which instantaneously directs fluid to the top or bottom of the follow-up cylinder 30 in response to relative movement of the follow-up platform 40 and reference platform 50, is stability within the system maintained. Since the sensing of relative movement and correction is almost instantaneous, the clockwise or counterclockwise error which occurs is very small. Valve 60 is a proportional flow-type valve. Hence an extremely small error receives a proportionally small correction flow of fluid, and "hunting" or over-correction is avoided.

"Reference pressure" is determined by that amount of pressure necessary to maintain adequate tension on the conveyor belt during all normal operating parameters. Since pump 80 can operate at between zero and 42.2 Kg./sq.cm., a wide operating range is possible.

Several adjustments are possible to compensate for variables present in the system. For example, in the proportional-type valve 60, the sensitivity and flow rate is controlled by the degrees of rotation of the valve stem 75. Therefore, as is shown in FIG. 3, pin 42 can be moved inwardly or outwardly relative to valve stem 75 by means of the adjustment slot 41a. The closer towards the valve stem 75 pin 42 is moved, the greater the number of degrees of rotation caused by any given relative movement of the follow-up platform 40 relative to the reference platform 50. Conversely, movement of the pin 42 outwardly away from the valve stem 75 results in greater sensitivity and a smaller correction flow of fluid in response to a pre-determined relative movement of the follow-up platform 40 relative to the reference platform 50.

Finally, slight errors in cable length or the like can be corrected by use of the turnbuckle 48 positioned intermediate the follow-up platform 40 and the cable 45. The turnbuckle 48 makes possible an extremely sensitive adjustment in the relative positions of the follow-up platform and reference platform so that when follow-up bearing 12 and reference bearing 13 are in precise alignment, any slight misalignment caused by cable stretch or the like can be easily compensated for.

While the foregoing embodiment has taken the form of a belt training apparatus, it is apparent from the foregoing that the invention is susceptible to application in a wide variety of embodiments.

Described above is a preferred embodiment of an apparatus for maintaining relative positional alignment between two spaced-apart points on a moveable member. Also described above is a preferred method for maintaining relative positional alignment between two spaced-apart points on a moveable member. Various details of the invention as described above may be changed without departing from the scope of the invention. Furthermore, the foregoing description is for the purposes of illustration only and not for the purpose of limitation—the invention being defined by the claims.

I claim:

1. An apparatus for maintaining relative positional alignment between two spaced-apart points on a movable member, comprising:
   (a) a hydraulic pump;
   (b) first hydraulic means operatively connected to said hydraulic pump and to a first point on the member for applying a reference hydraulic pressure to the member and for moving the member to maintain said applied pressure at a constant, pre-determined pressure level;
   (c) second hydraulic means operatively connected to said hydraulic pump and to a second point on the member spaced apart from said first point;
   (d) sensing means cooperating with the member for detecting movement of the member at said first point relative to said second point; and
   (e) hydraulic servo-valve means cooperating with said sensing means and selectively directing hydraulic fluid to said second hydraulic means in response to said sensing means for moving the member at said second point in a direction and for a distance corresponding to the movement of the member at said first point, said hydraulic servo-valve means comprising a circular valve housing adapted for unison movement with one of said first and second points on the member and including port means for conveying hydraulic fluid to said second hydraulic means, and a valve body mounted for rotational movement within said valve housing and cooperating with the other of said first and second points on said movable member for directing fluid to said second hydraulic means in response to and proportional to the relative movement between said first point and said second point on the movable member;
   whereby tthe member at said second point follows the movement of the member at said first point and thereby maintains relative positional alignment between said first point and said second point on the member.

2. An apparatus according to claim 1, wherein said first hydraulic means and said second hydraulic means each comprise a hydraulic cylinder.

3. An apparatus according to claim 1, wherein said sensing means include:
   (a) first platform means operatively connected to the member at said first point and mounted for movement corresponding to the movement of the member at said first point;
   (b) second platform means operatively connected to the member at said second point and mounted for movement corresponding to the movement of the member at said second point; and,
   (c) wherein said valve housing is carried by one of said first and second platform means and said valve body is carried by the other of said first and second platform means.

4. An apparatus according to claim 3, and including a valve stem carried by said valve body, said valve stem having a fork on its free end; the other of said first and second platform means including a pin mounted thereon in such position as to ride within said fork for transmitting relative movement from one of said first and second platform means to the other of said first and second platform means.

5. An apparatus according to claim 3, wherein said first platform means is operatively connected to the member by means of a cable and wherein said second platform means is operatively connected to the member at said second point by a cable.

6. An apparatus according to claim 1, wherein said first hydraulic means is operatively connected to said first point on the member by a cable; and wherein said second hydraulic means is coupled to said second point on the member by means of a cable.

7. An apparatus according to claim 6, and including means for taking up slack and thermal expansion of the cable connecting said first platform means to the member at said first point, and said second platform means to the member at said second point.

8. An apparatus for maintaining relative positional alignment in a plane between two spaced-apart points on a rotatable axle, comprising:
   (a) a hydraulic pump;
   (b) first hydraulic means operatively coupled to said hydraulic pump and to a first point on the axle for applying a reference hydraulic pressure to the axle and for moving the axle in said plane to maintain said applied pressure at a constant, pre-determined pressure level;
   (c) second hydraulic means operatively coupled to said hydraulic pump and to a second point on the axle spaced-apart from said first point;
   (d) sensing means cooperating with the axle for detecting movement of the axle at said first point relative to said second point; and
   (e) hydraulic servo-valve means cooperating with said sensing means and selectively directing hydraulic fluid to said second hydraulic means in response to said sensing means for moving the axle at said second point in a direction and for a distance corresponding to the movement of the axle at said first point, said hydraulic servo-valve means comprising a circular valve housing adapted for unison movement with one of said first and second points and including port means for conveying hydraulic fluid to said second hydraulic means, and a valve body mounted for rotational movement within said valve housing and cooperating with the other of said first and second points on said axle for directing fluid to said second hydraulic means in response to and proportional to the relative movement between said first point and said second point on the axle;
   whereby the axle at said second point follows the movement of the axle at said first point and thereby maintains relative positional alignment in said plane between said first point and said second point on the axle.

9. An apparatus according to claim 8, wherein said first hydraulic means and said second hydraulic means each comprise a hydraulic cylinder.

10. An apparatus according to claim 9, wherein said sensing means include:
    (a) first platform means operatively connected to the axle at said first point and mounted for movement corresponding to the movement of the axle at said first point;
    (b) second platform means operatively connected to the axle at said second point and mounted for movement corresponding to the movement of the axle at said second point; and, (c) wherein said valve housing is carried by one of said first and second platform means and said valve body is carried by the other of said first and second platform means.

11. An apparatus according to claim 10, and including a valve stem carried by said valve body, said valve stem having a fork on its free end; the other of said first and second platform means including a pin mounted thereon in such position as to ride within said fork for transmitting relative movement from one of said first and second platform means to the other of said first and second platform means.

12. An apparatus according to claim 8, and including a conveyor tail pulley rotatably mounted on said axle intermediate said first and second points thereon.

13. An apparatus according to claim 12, wherein said first and second points on said axle define, respectively, first and second take-up bearings mounted for independent planar movement.

14. A method of maintaining relative positional alignment between two spaced-apart points on a movable member, comprising the steps of:
   (a) applying a hydraulic reference pressure to said member at a first point thereon;
   (b) moving said member at said first point to maintain said reference hydraulic pressure at a constant pre-determined pressure level;
   (c) sensing the movement of said member at a second point on said member spaced-apart from said first point by means of a hydraulic servo-valve which includes a circular valve housing adapted for unison movement with one of said first and second points on the member and a valve body mounted for rotational movement within said valve housing in unison with the other of said first and second points on the member;
   (d) directing hydraulic pressure to the member at said second point in response to the sensed movement of said first point on the member relative to said second point on the member; and
   (e) moving the member at said second point in a direction and for a distance corresponding to the movement of the member at said first point.

15. A method according to claim 14, wherein the step of applying a reference hydraulic pressure to said first point on the member comprises pumping hydraulic fluid to a first hydraulic cylinder operatively connected to the member at said first point.

16. A method according to claim 15, wherein the step of moving the member at said first point to maintain said pressure at a constant, pre-determined pressure level comprises supplying hydraulic fluid to a hydraulic cylinder in response to movement of the member at said first point.

17. A method of maintaining relative positional alignment between two spaced-apart points on a rotatable axle, comprising the steps of:
   (a) applying a hydraulic reference pressure to said axle at a first point thereon;
   (b) moving said axle at said first point to maintain said reference hydraulic pressure at a constant, pre-determined pressure level;
   (c) sensing the movement of said axle at a second point on said axle spaced-apart from said first point by means of a hydraulic servo-valve which includes a circular valve housing adapted for unison movement with one of said first and second points on the axle and a valve body mounted for rotational movement within said valve housing in unison with the other of said first and second points on the axle;
   (d) directing hydraulic pressure to the axle at said second point in response to the sensed movement of said first point of the axle relative to said second point of the axle; and
   (e) moving the axle at said second point in a direction and for a distance corresponding to the movement of the axle at said first point.

* * * * *